US011706834B2

(12) United States Patent
Purkayastha et al.

(10) Patent No.: US 11,706,834 B2
(45) Date of Patent: Jul. 18, 2023

(54) USER EQUIPMENT COMMUNICATIONS WHILE OPERATING IN A SECONDARY CELL GROUP DEACTIVATED STATE

(71) Applicant: QUALCOMM Incorporated, San Diego, CA (US)

(72) Inventors: Punyaslok Purkayastha, San Diego, CA (US); Ozcan Ozturk, San Diego, CA (US); Aziz Gholmieh, Del Mar, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/332,366

(22) Filed: May 27, 2021

(65) Prior Publication Data

US 2022/0225457 A1    Jul. 14, 2022

Related U.S. Application Data

(60) Provisional application No. 63/136,112, filed on Jan. 11, 2021.

(51) Int. Cl.
*H04W 76/18* (2018.01)
*H04W 76/27* (2018.01)

(52) U.S. Cl.
CPC .......... *H04W 76/18* (2018.02); *H04W 76/27* (2018.02)

(58) Field of Classification Search
CPC ..... H04W 76/27; H04W 24/10; H04W 16/28; H04W 7/0617; H04W 7/088; H04W 7/0695; H04W 76/18
See application file for complete search history.

(56) References Cited

U.S. PATENT DOCUMENTS

2020/0022215 A1* 1/2020 Takahashi ............. H04W 76/27
2021/0029745 A1* 1/2021 Zhang ................... H04W 80/02
(Continued)

FOREIGN PATENT DOCUMENTS

WO         2022036630         2/2022

OTHER PUBLICATIONS

China Telecom: "Discussion on Efficient SCG Activation/Deactivation", 3GPP Draft, 3GPP TSG-RAN WG2 Meeting #112-e, R2-2009913, 3rd Generation Partnership Project (3GPP), Mobile Competence Centre, 650, Route Des Lucioles, F-06921 Sophia-Antipolis Cedex, France, vol. RAN WG2, No. Online, Nov. 2, 2020-Nov. 13, 2020 Oct. 23, 2020 (Oct. 23, 2020), XP051942695, 4 Pages, Retrieved from the Internet: URL: https://ftp.3gpp.org/tsg_ran/WG2_RL2/TSGR2_112-e/Docs/R2-2009913 zip [retrieved on Oct. 23, 2020] the whole document.
(Continued)

*Primary Examiner* — Anez C Ebrahim
(74) *Attorney, Agent, or Firm* — Harrity & Harrity, LLP; Dang M. Vo

(57) ABSTRACT

Various aspects of the present disclosure generally relate to wireless communication. In some aspects, a user equipment (UE) may perform radio link monitoring (RLM) reference signal measurements on a primary secondary cell (PSCell) while the UE is operating in a secondary cell group (SCG) deactivated state. The UE may perform beam failure detection (BFD) reference signal measurements while the UE is operating in the SCG deactivated state. The UE may transmit, to a master node associated with a master cell group (MCG), an SCG failure information message based at least in part on one of: a PSCell radio link failure (RLF) detection based at least in part on the RLM reference signal measurements, or a BFD based at least in part on the BFD reference signal measurements. Numerous other aspects are described.

30 Claims, 7 Drawing Sheets

(56) References Cited

U.S. PATENT DOCUMENTS

| | | | |
|---|---|---|---|
| 2021/0105765 A1* | 4/2021 | Cirik | H04B 7/0695 |
| 2021/0274535 A1* | 9/2021 | Yi | H04L 1/1851 |
| 2022/0201504 A1* | 6/2022 | Fujimura | H04W 76/20 |

OTHER PUBLICATIONS

Huawei, et al., "Discussion on SCG Deactivation and Activation", 3GPP Draft, 3GPP TSG-RAN WG2 Meeting #112-e, R2-2010124, 3rd Generation Partnership Project (3GPP), Mobile Competence Centre, 650, Route Des Lucioles, F-06921 Sophia-Antipolis Cedex, France, vol. RAN WG2, No. Online, Nov. 2, 2020-Nov. 13, 2020 Oct. 22, 2020 (Oct. 22, 2020), XP051941552, 6, Pages, Retrieved from the Internet: URL: https://ftp.3gpp.org/tsg_ran/WG2_RL2/TSGR2_112-e/Docs/R2-2010124.zip [retrieved on Oct. 22, 2020] the whole document.

International Search Report and Written Opinion—PCT/US2021/073140—ISA/EPO—dated Apr. 19, 2022.

VIVO: "Activation and Deactivation Mechanism for SCG and SCells", 3GPP Draft, 3GPP TSG-RAN WG2 Meeting #112 electronic, R2-2010290, 3rd Generation Partnership Project (3GPP), Mobile Competence Centre, 650, Route Des Lucioles, F-06921 Sophia-Antipolis Cedex, France, vol. RAN WG2, No. Electronic, Nov. 2, 2020-Nov. 13, 2020 Oct. 23, 2020 (Oct. 13, 2020), XP051942970, 7 Pages, Retrieved from the Internet: URL: https://flp.3gpp.org/tsg_ran/WG2_RL2/TSGR2_112-e/Docs/R2-2010290.zip [retrieved on Oct. 23, 2020] the whole document.

* cited by examiner

USER EQUIPMENT COMMUNICATIONS WHILE OPERATING IN A SECONDARY CELL GROUP DEACTIVATED STATE

CROSS-REFERENCE TO RELATED APPLICATION

This Patent Application claims priority to Provisional Patent Application No. 63/136,112, filed on Jan. 11, 2021, entitled "USER EQUIPMENT COMMUNICATIONS WHILE OPERATING IN A SECONDARY CELL GROUP DEACTIVATED STATE," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for user equipment (UE) communications while operating in a secondary cell group (SCG) deactivated state.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a base station via the downlink and uplink. The downlink (or forward link) refers to the communication link from the base station to the UE, and the uplink (or reverse link) refers to the communication link from the UE to the base station. As will be described in more detail herein, a base station may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a UE for wireless communication includes a memory; and one or more processors operatively coupled to the memory, the one or more processors configured to: perform radio link monitoring (RLM) reference signal measurements on a primary secondary cell (PSCell) while the UE is operating in an SCG deactivated state; perform beam failure detection (BFD) reference signal measurements while the UE is operating in the SCG deactivated state; and transmit, to a master node associated with a master cell group (MCG), an SCG failure information message based at least in part on one of: a PSCell radio link failure (RLF) detection based at least in part on the RLM reference signal measurements, or a BFD based at least in part on the BFD reference signal measurements.

In some aspects, a master node for wireless communication includes a memory; and one or more processors operatively coupled to the memory, the one or more processors configured to: receive, from a UE operating in an SCG deactivated state, an SCG failure information message based at least in part on one of: a PSCell RLF detection based at least in part on RLM reference signal measurements, or a BFD based at least in part on BFD reference signal measurements; transmit, to a secondary node, the SCG failure information message; receive, from the secondary node, a radio resource control (RRC) reconfiguration based at least in part on the SCG failure information message; and transmit, to the UE, the RRC reconfiguration received from the secondary node.

In some aspects, a method of wireless communication performed by a UE includes performing RLM reference signal measurements on a PSCell while the UE is operating in an SCG deactivated state; performing BFD reference signal measurements while the UE is operating in the SCG deactivated state; and transmitting, to a master node associated with an MCG, an SCG failure information message based at least in part on one of: a PSCell RLF detection based at least in part on the RLM reference signal measurements, or a BFD based at least in part on the BFD reference signal measurements.

In some aspects, a method of wireless communication performed by a master node includes receiving, from a UE operating in an SCG deactivated state, an SCG failure information message based at least in part on one of: a PSCell RLF detection based at least in part on RLM reference signal measurements, or a BFD based at least in part on BFD reference signal measurements; transmitting, to a secondary node, the SCG failure information message; receiving, from the secondary node, an RRC reconfiguration based at least in part on the SCG failure information message; and transmitting, to the UE, the RRC reconfiguration received from the secondary node.

In some aspects, a non-transitory computer-readable medium storing a set of instructions for wireless communication includes one or more instructions that, when executed by one or more processors of a UE, cause the UE to: perform RLM reference signal measurements on a PSCell while the UE is operating in an SCG deactivated state; perform BFD reference signal measurements while the UE is operating in the SCG deactivated state; and transmit, to a master node associated with an MCG, an SCG failure information message based at least in part on one of: a PSCell RLF detection based at least in part on the RLM reference signal measurements, or a BFD based at least in part on the BFD reference signal measurements.

In some aspects, a non-transitory computer-readable medium storing a set of instructions for wireless communication includes one or more instructions that, when executed by one or more processors of a master node, cause the master node to: receive, from a UE operating in an SCG deactivated state, an SCG failure information message based at least in part on one of: a PSCell RLF detection based at least in part on RLM reference signal measurements, or a BFD based at least in part on BFD reference signal measurements; transmit, to a secondary node, the SCG failure information message; receive, from the secondary node, an RRC reconfiguration based at least in part on the SCG failure information message; and transmit, to the UE, the RRC reconfiguration received from the secondary node.

In some aspects, an apparatus for wireless communication includes means for performing RLM reference signal measurements on a PSCell while the apparatus is operating in an SCG deactivated state; means for performing BFD reference signal measurements while the apparatus is operating in the SCG deactivated state; and means for transmitting, to a master node associated with an MCG, an SCG failure information message based at least in part on one of: a PSCell RLF detection based at least in part on the RLM reference signal measurements, or a BFD based at least in part on the BFD reference signal measurements.

In some aspects, an apparatus for wireless communication includes means for receiving, from a UE operating in an SCG deactivated state, an SCG failure information message based at least in part on one of: a PSCell RLF detection based at least in part on RLM reference signal measurements, or a BFD based at least in part on BFD reference signal measurements; means for transmitting, to a secondary node, the SCG failure information message; means for receiving, from the secondary node, an RRC reconfiguration based at least in part on the SCG failure information message; and means for transmitting, to the UE, the RRC reconfiguration received from the secondary node.

Aspects generally include a method, apparatus, system, computer program product, non-transitory computer-readable medium, user equipment, base station, node, master node, secondary node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
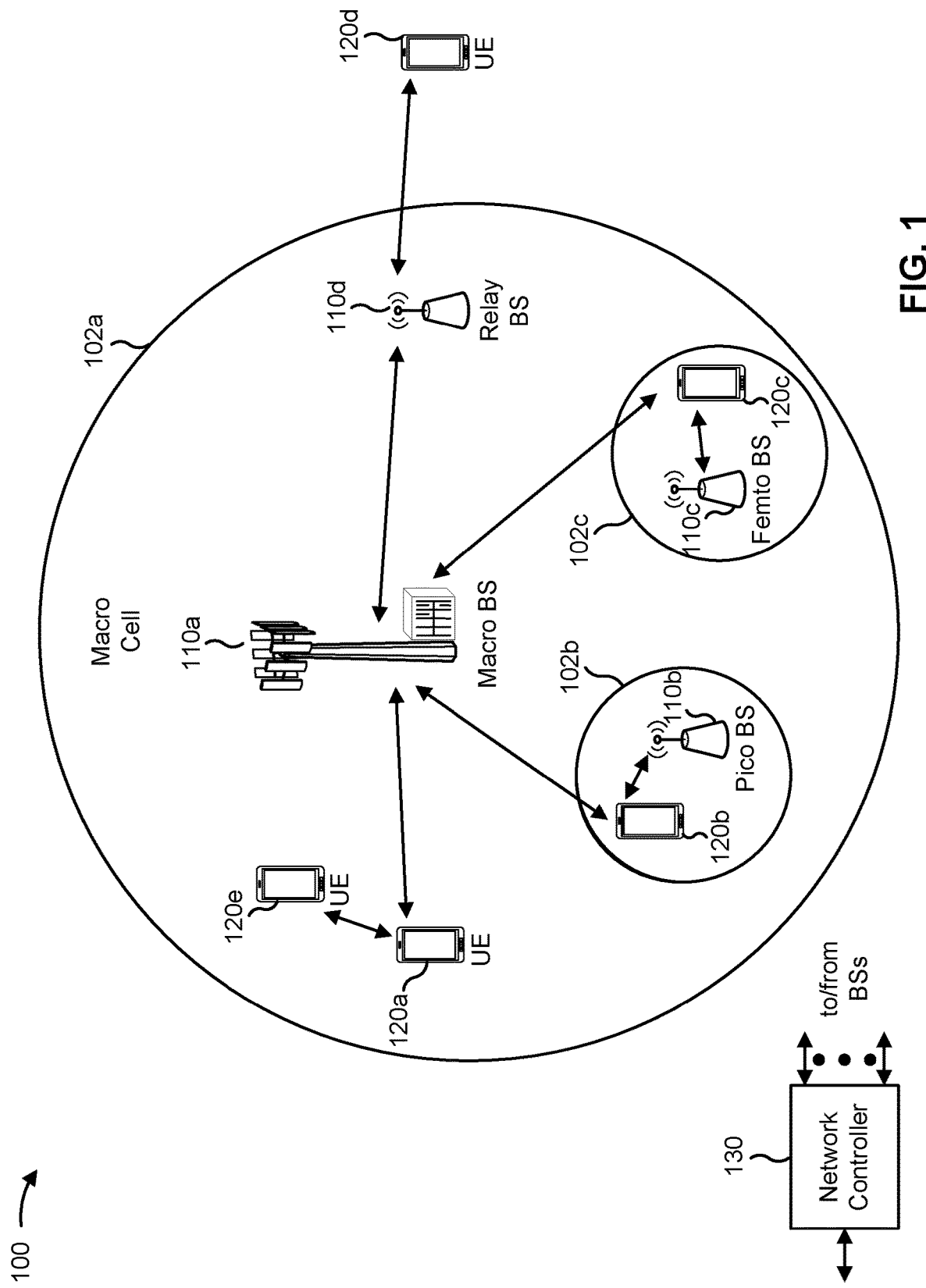
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each base station may provide communication coverage for a particular geographic area. In 3GPP, the term "cell" can refer to a coverage area of a base station and/or a base station subsystem serving this coverage area, depending on the context in which the term is used.

A base station may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG. 1, a base station 110a may be a macro base station for a macro cell 102a, a base station 110b may be a pico base station for a pico cell 102b, and a base station 110c may be a femto base station for a femto cell 102c. A base station may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile base station. In some aspects, the base stations may be interconnected to one another and/or to one or more other base stations or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a base station or a UE) and send a transmission of the data to a downstream station (e.g., a UE or a base station). A relay station may also be a UE that can relay transmissions for other UEs. In the example shown in FIG. 1, a relay base station 110d may communicate with macro base station 110a and a UE 120d in order to facilitate communication between base station 110a and UE 120d. A relay base station may also be referred to as a relay station, a relay base station, a relay, or the like.

Wireless network 100 may be a heterogeneous network that includes base stations of different types, such as macro base stations, pico base stations, femto base stations, relay base stations, or the like. These different types of base stations may have different transmit power levels, different coverage areas, and different impacts on interference in wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to a set of base stations and may provide coordination and control for these base stations. Network controller 130 may communicate with the base stations via a backhaul. The base stations may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
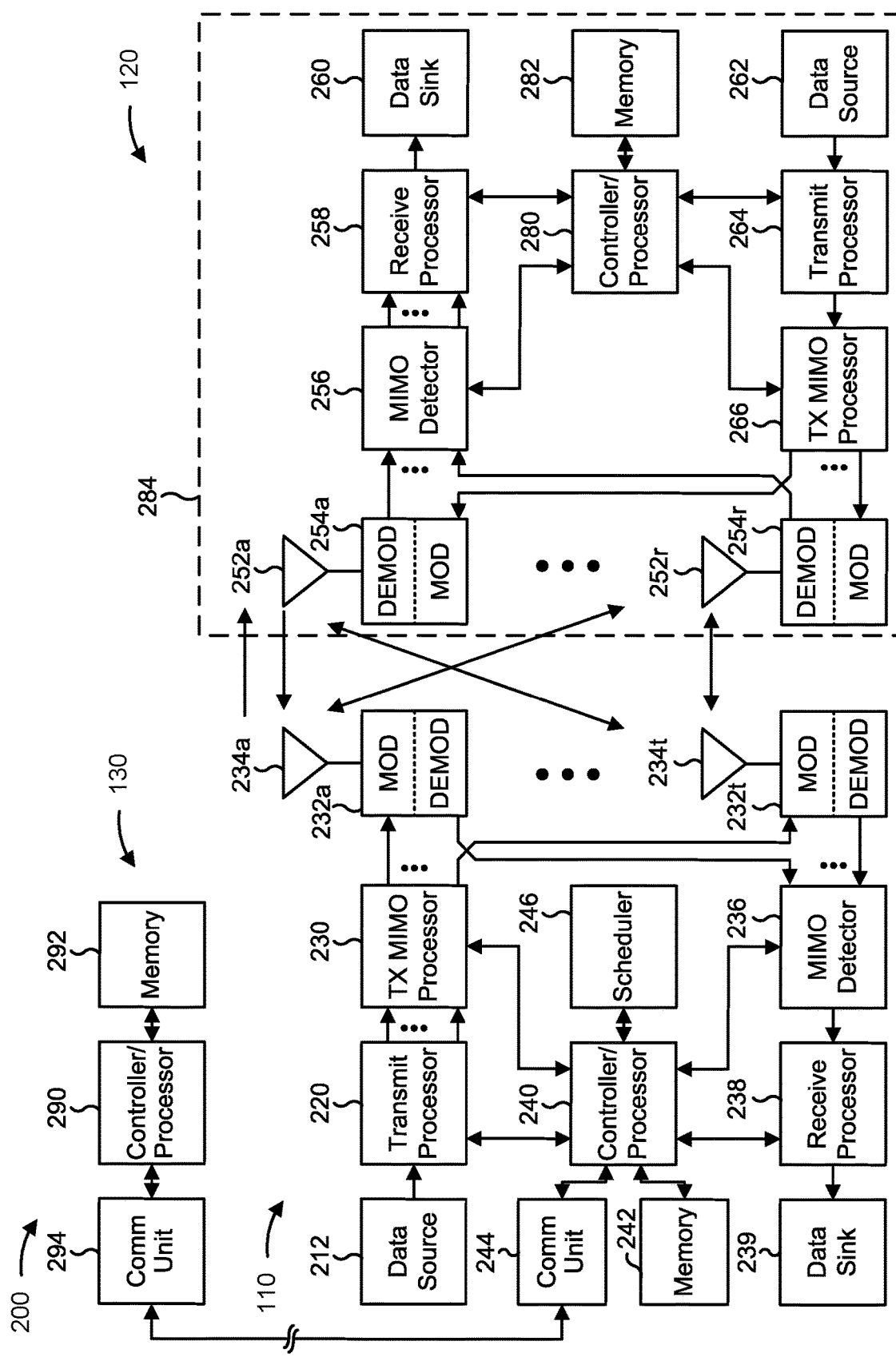
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-5.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-5.

Controller/processor 240 of base station 110, controller/processor 280 of UE 120, and/or any other component(s) of FIG. 2 may perform one or more techniques associated with UE communications while operating in an SCG deactivated state, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, a UE (e.g., UE 120) includes means for performing RLM reference signal measurements on a PSCell while the UE is operating in an SCG deactivated state; means for performing BFD reference signal measurements while the UE is operating in the SCG deactivated state; or means for transmitting, to a master node associated with an MCG, an SCG failure information message based at least in part on one of: a PSCell RLF detection based at least in part on the RLM reference signal measurements, or a BFD based at least in part on the BFD reference signal measurements. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a master node (e.g., base station 110) includes means for receiving, from a UE operating in an SCG deactivated state, an SCG failure information message based at least in part on one of: a PSCell RLF detection based at least in part on RLM reference signal measurements, or a BFD based at least in part on BFD reference signal measurements; transmitting, to a secondary node, the SCG failure information message; receiving, from the secondary node, an RRC reconfiguration based at least in part on the SCG failure information message; and transmitting, to the UE, the RRC reconfiguration received from the secondary node.

In some aspects, the master node described herein is the base station 110, is included in the base station 110, or includes one or more components of the base station 110 shown in FIG. 2. In some aspects, the means for the master node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may enter an SCG deactivated state to save power when the UE, a master node, and/or a secondary node does not currently have data to transmit over the SCG. The UE may enter the SCG deactivated state based at least in part on a deactivation command received from a base station. The UE may transition from the SCG deactivated state to an SCG activated state based at least in part on data becoming available to transmit over the SCG at the UE, the master node, and/or the secondary node, and based at least in part on the UE receiving an activation command from a base station.

The UE may perform radio resource management (RRM) measurements, RLM measurements, and/or BFD on a PSCell when the UE is operating in the SCG deactivated state. The UE may detect an RLF on the PSCell based at least in part on the RRM measurements and/or the RLM measurements. The RLF may occur for the UE when the PSCell of the UE is out of coverage.

During an RLM procedure performed while the UE is operating in the SCG deactivated state, the UE may measure downlink RLM reference signals on the PSCell received from the base station, which may correspond to a synchronization signal block (SSB) or a physical broadcast channel (PBCH) signal, or may correspond to a periodic channel state information reference signal (CSI-RS) transmitted on a beam. The UE may be configured with a set of RLM reference signals, which may be transmitted from the base station in a currently used beam of the UE and/or neighbor beams of the UE.

As an example, the base station may transmit a first RLM reference signal on a first beam, a second RLM reference signal on a second beam, and a third RLM reference signal on a third beam, where the second beam may be associated with a currently used beam and the first and third beams may be associated with neighbor beams.

The UE may be configured to measure a maximum number of RLM reference signals based at least in part on a carrier frequency. For example, for a carrier frequency below 3 GHz, the UE may be configured to measure a maximum of two RLM reference signals. For a carrier frequency between 3 GHz and 6 GHz, the UE may be configured to measure a maximum of four RLM reference signals. For a carrier frequency above 6 GHz, the UE may be configured to measure a maximum of eight RLM reference signals.

A moving UE, such as a UE moving within a cell, may be provided with an updated set of RLM reference signals to monitor as the UE moves across the cell, since a different set of beams may provide coverage in different parts of the cell. For example, the UE may receive, from the base station, an indication of an updated set of RLM reference signals to monitor based at least in part on the UE moving from a first area of the cell to a second area of the cell.

The UE may detect RLF based at least in part on an out-of-sync indication and/or an in-sync indication. The out-of-sync indication may be associated with the RLM reference signals (e.g., all of the RLM reference signals configured for the UE) being less than a configured threshold ($Q_{out}$). The out-of-sync indication may correspond to a presence of RLF for the UE. The in-sync indication may be associated with the RLM reference signals (e.g., any of the RLM reference signals configured for the UE) being greater than a configured threshold ($Q_{in}$). The in-sync indication may correspond to an absence of RLF for the UE. The UE may detect RLF when no in-sync indications occur within a duration of a timer after the UE detects a certain number of consecutive out-of-sync indications, indicating that channel conditions have deteriorated.

The UE may measure a set of configured BFD reference signals, such as periodic CSI-RSs, transmitted on a set of beams from the base station to the UE. The UE may determine that BFD reference signals (e.g., all BFD reference signals configured for the UE) are less than a configured threshold ($Q_{out\_BFD}$). A beam failure indication may be provided by a physical layer of the UE to a medium access control (MAC) layer of the UE based at least in part on the BFD reference signals being less than the configured threshold. The MAC layer of the UE may determine a beam failure based at least in part on a configured maximum number of beam failure indications being satisfied. In other words, the UE may determine the BFD based at least in part on the configured maximum number of beam failure indications being satisfied. The UE may initiate a BFR based at least in part on the BFD. The UE may initiate the BFR based at least in part on performing a random access channel (RACH) procedure on a new beam from a list of candidate beams configured by the base station. The new beam may not be associated with the BFD reference signals that are less than the configured threshold ($Q_{out\_BFD}$).

When the UE is in the SCG deactivated state, the UE may detect RLF (e.g., PSCell RLF due to the PSCell being out of coverage with respect to the UE) based at least in part on the RLM measurements and/or the BFD. In some cases, detecting the RLF based at least in part on the RLM measurements may be more robust as compared to using the BFD to detect the RLF. For example, the RLM measurements may involve using in-sync indications, which may indicate when radio conditions have improved, such that temporary degradation may not trigger RLF. In the case of SCG RLF, SCG failure information may be communicated by the UE via an MCG to initiate a radio link recovery, and may not be communicated via the SCG. Further, BFR may involve the UE performing a RACH procedure, which may consume an inordinate amount of power when the UE is in the SCG deactivated state. As a result, RLM mechanisms may be more advantageous over BFD/BFR when detecting RLF.

When operating in the SCG deactivated state, BFD at the UE may result in BFR at the UE, which may involve the UE performing the RACH procedure while still operating in the SCG deactivated state. Since the SCG deactivated state is a power saving state for the UE, performing the RACH procedure is not desirable and may consume power at the UE, due to the various communications involved during the RACH procedure.

In various aspects of techniques and apparatuses described herein, a UE may perform RLM reference signal measurements on a PSCell while the UE is operating in the SCG deactivated state. The UE may perform BFD reference signal measurements while the UE is operating in the SCG deactivated state. The UE may transmit, to a master node associated with an MCG, an SCG failure information message based at least in part on a PSCell RLF detection based at least in part on the RLM reference signal measurements, and/or a BFD based at least in part on the BFD reference signal measurements. The SCG failure information message may indicate the RLM reference signal measurements, the BFD reference signal measurements, and/or other reference signal measurements to be reported by the UE based at least in part on the configuration received from the master node or from a secondary node via the master node. The UE may receive, from the master node, an RRC reconfiguration based at least in part on the SCG failure information message transmitted to the master node. The RRC reconfiguration may include a RACH parameter configuration for the UE to use after transitioning from the SCG deactivated state to an SCG activated state. The RACH parameter configuration may define one or more beams to use for performing RACH and associated physical random access channel (PRACH) occasions or preamble indices, e.g., updated contention free random access (CFRA) preambles. The UE may transition from the SCG deactivated state to the SCG activated state. The UE may perform a RACH procedure to access the PSCell based at least in part on the RACH parameter configuration, and after transitioning to the SCG activated state.

Figure 3:
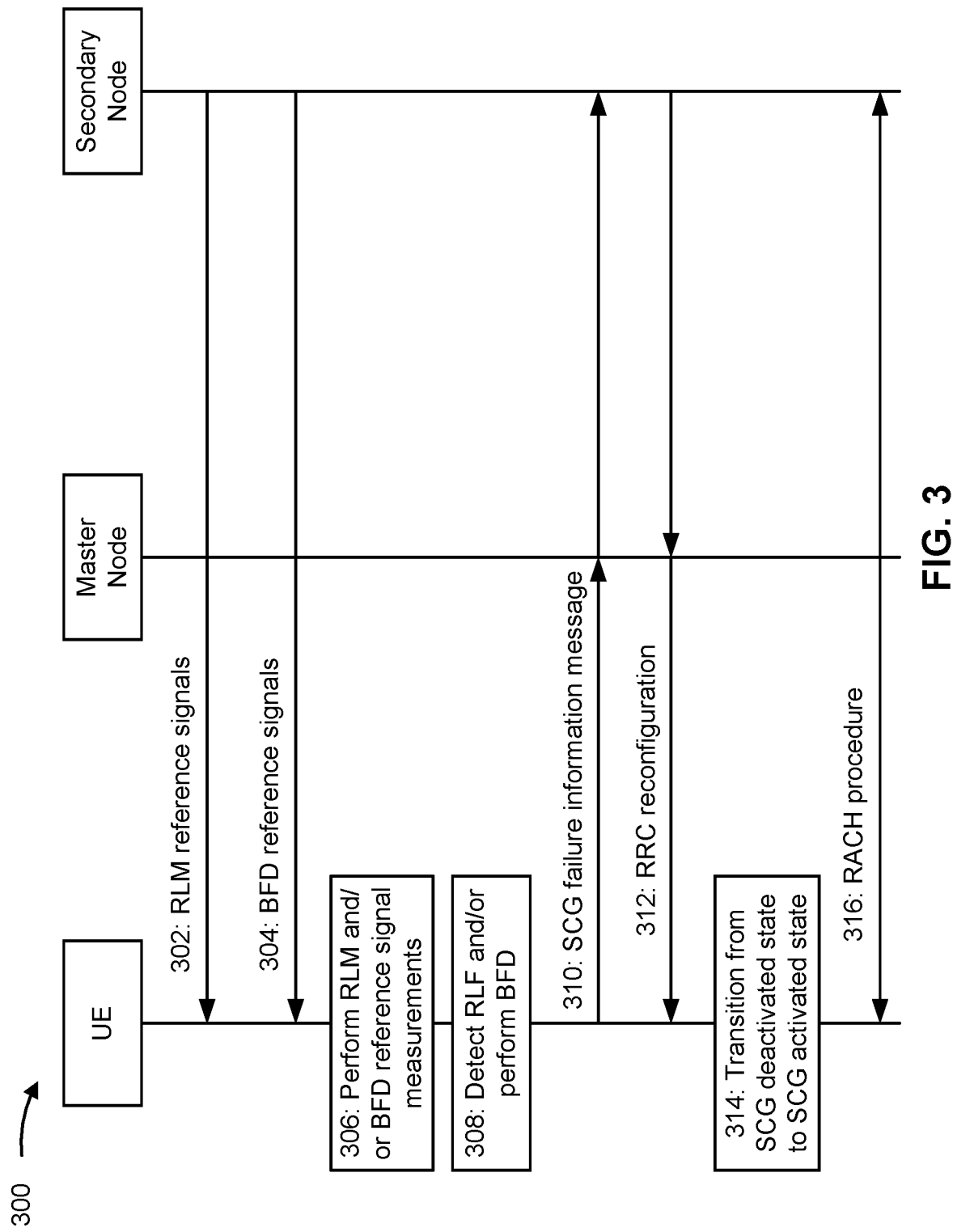
FIG. 3 is a diagram illustrating an example associated with UE communications while operating in an SCG deactivated state, in accordance with the present disclosure.

FIG. 3 is a diagram illustrating an example 300 of UE communications while operating in an SCG deactivated state, in accordance with the present disclosure. As shown in FIG. 3, example 300 includes communication between a UE (e.g., UE 120d), a master node (e.g., base station 110a), and a secondary node (e.g., base station 110d). In some aspects, the UE, the master node, and the secondary node may be included in a wireless network such as wireless network 100. In some aspects, the UE, the master node, and the secondary node may operate in a multi-RAT dual connectivity (MR-DC) system.

As shown by reference number 302, the UE may receive RLM reference signals. The UE may receive the RLM reference signals from the secondary node. The secondary node may be associated with an SCG, which may include a PSCell. The RLM reference signals may be received on the PSCell while the UE is operating in an SCG deactivated state. The RLM reference signals may be downlink RLM reference signals. The RLM reference signals may be an SSB or PBCH signal, or the RLM reference signals may be periodic CSI-RSs. The RLM reference signals may be received on a beam or a set of beams at the UE.

As shown by reference number 304, the UE may receive BFD reference signals. The UE may receive the BFD reference signals from the secondary node. The BFD reference signals may be received on a PSCell while the UE is operating in the SCG deactivated state. The BFD reference signals may be periodic CSI-RSs. The RLM reference signals may be received on a beam or a set of beams at the UE.

As shown by reference number 306, the UE may perform RLM reference signal measurements on the PSCell while the UE is operating in the SCG deactivated state. The UE may measure the received RLM reference signals to obtain the RLM reference signal measurements. In other words, the UE may perform RLM on the PSCell in the SCG deactivated state. Additionally or alternatively to performing RLM reference signal measurements, the UE may perform BFD reference signal measurements on the PSCell while the UE is operating in the SCG deactivated state. The UE may measure the received BFD reference signals to obtain the BFD reference signal measurements.

As shown by reference number 308, the UE may detect a PSCell RLF based at least in part on the RLM reference signal measurements. For example, the UE may detect the PSCell RLF based at least in part on the RLM reference signal measurements not satisfying a threshold. Alternatively, or additionally, the UE may perform a BFD based at least in part on the BFD reference signal measurements. For example, the UE may determine the BFD based at least in part on the BFD reference signal measurements not satisfying a threshold.

As shown by reference number 310, the UE may transmit, to the master node associated with an MCG, an SCG failure information message. The UE may transmit the SCG failure information message based at least in part on the PSCell RLF detection, which may be based at least in part on the RLM reference signal measurements. Alternatively, the UE may transmit the SCG failure information message based at least in part on the BFD, which may be based at least in part on the BFD reference signal measurements. The UE may transmit the SCG failure information message based at least in part on an SCG failure recovery procedure initiated at the UE. In other words, the UE may initiate an SCG failure recovery procedure, which may involve transmitting the SCG failure information message, via the MCG based at least in part on the UE detecting PSCell RLF or the UE detecting a beam failure.

In some aspects, the master node may forward the SCG failure information message to the secondary node. Alternatively, the master node may transmit information indicated in the SCG failure information message to the secondary node.

In some aspects, the SCG failure information message may indicate the RLM reference signal measurements or the BFD reference signal measurements. In other words, the UE may report beam measurement results in the SCG failure information message.

In some aspects, the UE may receive, from the master node, a configuration that enables the UE to initiate the SCG failure recovery procedure based at least in part on the BFD. In other words, the UE initiating the SCG failure recovery procedure via the MCG based at least in part on the BFD may be configurable by a network. In some aspects, the UE may receive the configuration from the secondary node via the master node. In other words, the secondary node may transmit the configuration to the master node, and the master node may forward the configuration to the UE.

As shown by reference number 312, the UE may receive, from the master node, an RRC reconfiguration based at least in part on the SCG failure information message transmitted to the master node. The RRC reconfiguration may indicate an updated set of beams for the UE to measure, and/or an updated RLM configuration that includes an updated set of RLM reference signals for the UE to measure. In other words, the RRC reconfiguration may indicate a new set of beams for the UE to measure, and/or a new RLM configuration with a new set of RLM reference signals for the UE to measure. The RRC reconfiguration may enable the UE to perform updated RLM reference signal measurements.

In some aspects, the UE may receive the RRC configuration from the secondary node via the master node. In other words, the secondary node may transmit the RRC configuration to the master node, and the master node may forward the RRC configuration to the UE.

In some aspects, the RRC reconfiguration may include an information element (IE) associated with performing RLM measurements, performing BFD measurements, and/or reporting of measurement results including beam measurements based at least in part on detection of the PSCell RLF or the BFD while the UE is operating in the SCG deactivated state. In other words, the RRC reconfiguration may include an IE that is associated with RLM measurements and beam measurements, as well as measurement reporting in the SCG deactivated state.

In some aspects, the RRC reconfiguration may indicate a set of RLM reference signals for the UE to measure, a set of BFD reference signals for the UE to measure, and/or a set of reference signals for the UE to measure separate from the set of RLM reference signals and the set of BFD reference signals. The RLM reference signals, the BFD reference signals, and the reference signals separate from the RLM reference signals and the set of BFD reference signals may be configured to be transmitted by the secondary node using beams associated with the PSCell. In other words, the IE in the RRC reconfiguration may indicate a set of RLM measurements for the UE to measure, a set of BFD reference signals for the UE to measure, and a set of reference signals for the UE to measure in addition to the RLM reference signals and the BFD reference signals, where such reference signals may be transmitted in beams in the PSCell.

In some aspects, the RRC reconfiguration may indicate that the UE is to transmit the SCG failure information message based at least in part on the BFD, and that the SCG failure information message is to include a beam measurement report. The beam measurement report may include the BFD reference signal measurements. In other words, the RRC reconfiguration may include an indication as to whether the UE is to transmit SCG failure information after detection of the beam failure and include the beam measurement report in the SCG failure information.

In some aspects, the RRC reconfiguration may indicate that the SCG failure information message is to include the beam measurement report, which may include the BFD reference signal measurements, when the UE is operating in the SCG deactivated state. In other words, the RRC reconfiguration may include an indication as to whether the UE is to include a beam measurement report in SCG failure information transmitted when the UE is in the SCG deactivated state.

In some aspects, the RRC reconfiguration may indicate that the SCG failure information message is to include the RLM reference signal measurements, the BFD reference signal measurements, and/or reference signal measurements separate from the RLM reference signal measurements and the BFD reference signal measurements. In other words, the RRC reconfiguration may indicate a set of beam measurements to report in the SCG failure information, which may be associated with reference signals in addition to the RLM reference signals.

In some aspects, the RRC reconfiguration may indicate a RACH parameter configuration for the UE to use after transitioning from the SCG deactivated state to an SCG activated state. The RACH parameter configuration may define one or more beams to use for performing RACH and associated RACH occasions, and/or preamble indices to be associated with a RACH procedure. In other words, the RRC reconfiguration containing an updated RLM configuration may also provide the RACH parameter configuration to use after an SCG activation. The RRC reconfiguration may define an association between SSB/PBCH block indices (or beams) and physical random access channel (PRACH) occasions, and/or preamble indices.

In some aspects, the UE may receive, from the master node, an SCG activation command to transition the UE from the SCG deactivated state to the SCG activated state. The SCG activation command may indicate the RACH parameter configuration. In other words, in this example, the UE may receive the RACH parameter configuration via the SCG activation command as opposed to the RRC reconfiguration.

As shown by reference number 314, the UE may transition from the SCG deactivated state to the SCG activated state. The UE may transition to the SCG activated state based at least in part on the SCG activation command received from the master node.

As shown by reference number 316, the UE may perform the RACH procedure with the secondary node after the UE transitions to the SCG activated state. For example, the UE may determine that a timing advance (TA) timer has expired. The UE may perform the RACH procedure to access the PSCell associated with the SCG based at least in part on the TA timer being expired. The UE may perform the RACH procedure based at least in part on the RACH parameter configuration, which may be received at the UE via the RRC reconfiguration or via the SCG activation command. In other words, after the SCG activation, if the TA timer has expired, the UE may perform the RACH using a configured beam and associated RACH parameters. The beam may be selected based at least in part on a measured quality (e.g., a measured RSRP) and/or whether contention free RACH was configured for the beam.

In some aspects, the UE may determine that the TA timer has not expired, and the UE may not perform the RACH procedure to access the PSCell associated with the secondary node based at least in part on the TA timer not being expired. In other words, when the TA timer has not expired, the UE may not perform RACH to access the PSCell. An example scenario where the UE does not perform RACH to access the PSCell is if the TA timer has not expired and there is at least one configured beam that has a measured signal quality, e.g., RSRP, satisfying a threshold that the UE can thus use.

As indicated above, FIG. 3 is provided as an example. Other examples may differ from what is described with regard to FIG. 3.

Figure 4:
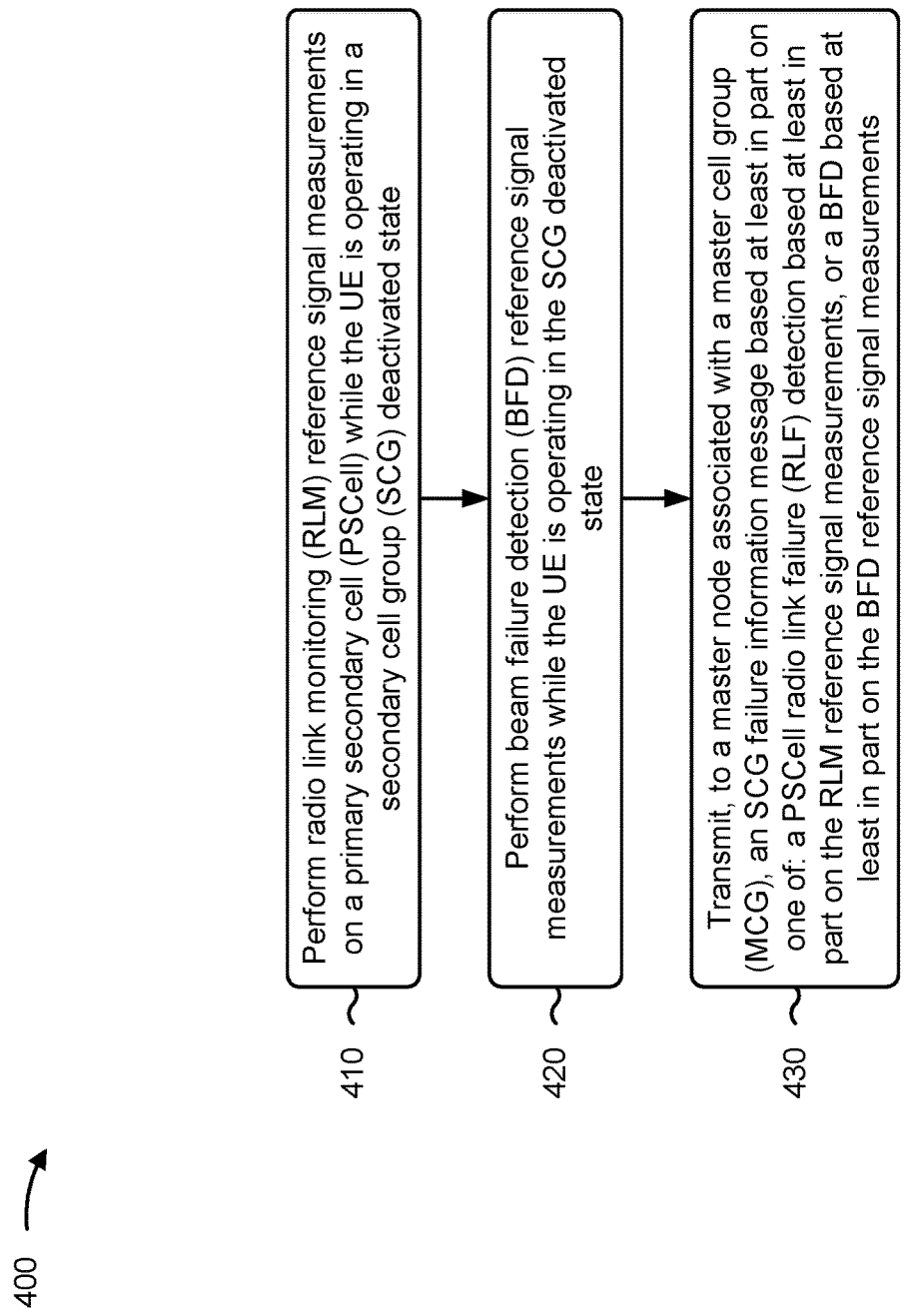
FIGS. 4-5 are diagrams illustrating example processes associated with UE communications while operating in an SCG deactivated state, in accordance with the present disclosure.

FIG. 4 is a diagram illustrating an example process 400 performed, for example, by a UE, in accordance with the present disclosure. Example process 400 is an example where the UE (e.g., UE 120) performs operations associated with user equipment communications while operating in an SCG deactivated state.

As shown in FIG. 4, in some aspects, process 400 may include performing RLM reference signal measurements on a PSCell while the UE is operating in an SCG deactivated state (block 410). For example, the UE (e.g., using measurement component 608, depicted in FIG. 6) may perform RLM reference signal measurements on a PSCell while the UE is operating in an SCG deactivated state, as described above.

As further shown in FIG. 4, in some aspects, process 400 may include performing BFD reference signal measurements while the UE is operating in the SCG deactivated state (block 420). For example, the UE (e.g., using measurement component 608) may perform BFD reference signal measurements while the UE is operating in the SCG deactivated state, as described above.

As further shown in FIG. 4, in some aspects, process 400 may include transmitting, to a master node associated with an MCG, an SCG failure information message based at least in part on one of: a PSCell RLF detection based at least in part on the RLM reference signal measurements, or a BFD based at least in part on the BFD reference signal measurements (block 430). For example, the UE (e.g., using transmission component 604, depicted in FIG. 6) may transmit, to a master node associated with an MCG, an SCG failure information message based at least in part on one of: a PSCell RLF detection based at least in part on the RLM reference signal measurements, or a BFD based at least in part on the BFD reference signal measurements, as described above.

Process 400 may include additional aspects, such as any single aspect or any combination of aspects described below and/or in connection with one or more other processes described elsewhere herein.

In a first aspect, the SCG failure information message is transmitted based at least in part on an SCG failure recovery procedure initiated at the UE.

In a second aspect, alone or in combination with the first aspect, process 400 includes receiving, from the master node associated with the MCG or from a secondary node via the master node, a configuration that enables the UE to initiate the SCG failure recovery procedure based at least in part on the BFD.

In a third aspect, alone or in combination with one or more of the first and second aspects, the SCG failure information message indicates one or more of the RLM reference signal measurements, the BFD reference signal measurements, or other reference signal measurements to be reported by the UE based at least in part on the configuration received from the master node or from the secondary node via the master node.

In a fourth aspect, alone or in combination with one or more of the first through third aspects, process 400 includes receiving, from the master node associated with the MCG or from a secondary node via the master node, an RRC reconfiguration based at least in part on the SCG failure information message transmitted to the master node and forwarded by the master node to the secondary node, wherein the RRC reconfiguration indicates an updated set of beams for the UE to measure, and an updated RLM configuration that includes an updated set of RLM reference signals for the UE to measure.

In a fifth aspect, alone or in combination with one or more of the first through fourth aspects, process 400 includes performing updated RLM reference signal measurements based at least in part on the RRC reconfiguration received from the master node or from the secondary node via the master node.

In a sixth aspect, alone or in combination with one or more of the first through fifth aspects, the RRC reconfiguration includes an information element associated with performing RLM measurements, performing BFD measurements, and reporting of measurement results including beam measurements based at least in part on detection of the PSCell RLF or the BFD while the UE is operating in the SCG deactivated state.

In a seventh aspect, alone or in combination with one or more of the first through sixth aspects, the RRC reconfiguration indicates a set of RLM reference signals for the UE to measure, a set of reference signals for the UE to measure separate from the set of RLM reference signals and a set of BFD reference signals, and the set of BFD reference signals for the UE to measure, wherein the RLM reference signals, the reference signals separate from the RLM reference signals and the set of BFD reference signals, and the BFD reference signals are configured to be transmitted by the secondary node using beams associated with the PSCell.

In an eighth aspect, alone or in combination with one or more of the first through seventh aspects, the RRC reconfiguration indicates that the UE is to transmit the SCG failure information message based at least in part on the BFD, and that the SCG failure information message is to include a beam measurement report.

In a ninth aspect, alone or in combination with one or more of the first through eighth aspects, the RRC reconfiguration indicates that the SCG failure information message is to include a beam measurement report when the UE is operating in the SCG deactivated state.

In a tenth aspect, alone or in combination with one or more of the first through nineth aspects, the RRC reconfiguration indicates that the SCG failure information message is to include one or more of the RLM reference signal measurements, the BFD reference signal measurements, or reference signal measurements separate from the RLM reference signal measurements and the BFD reference signal measurements.

In an eleventh aspect, alone or in combination with one or more of the first through tenth aspects, the RRC reconfiguration indicates a RACH parameter configuration for the UE to use after transitioning from the SCG deactivated state to an SCG activated state, wherein the RACH parameter configuration defines one or more of beams to use for performing RACH and associated RACH occasions or preamble indices.

In a twelfth aspect, alone or in combination with one or more of the first through eleventh aspects, process 400 includes receiving, from the master node, an SCG activation command to transition the UE from the SCG deactivated state to an SCG activated state, wherein the SCG activation command indicates a RACH parameter configuration, wherein the RACH parameter configuration defines one or more of beams to use for performing RACH and associated RACH occasions or preamble indices.

In a thirteenth aspect, alone or in combination with one or more of the first through twelfth aspects, process 400 includes transitioning from the SCG deactivated state to an SCG activated state, determining that a timing advance timer has expired, and determining to perform a RACH procedure to access the PSCell based at least in part on the timing advance timer being expired, wherein the RACH procedure is based at least in part on a RACH parameter configuration.

In a fourteenth aspect, alone or in combination with one or more of the first through thirteenth aspects, process 400 includes transitioning from the SCG deactivated state to an SCG activated state, determining that a timing advance timer has not expired, and determining to not perform a RACH procedure to access the PSCell based at least in part on the timing advance timer not being expired.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
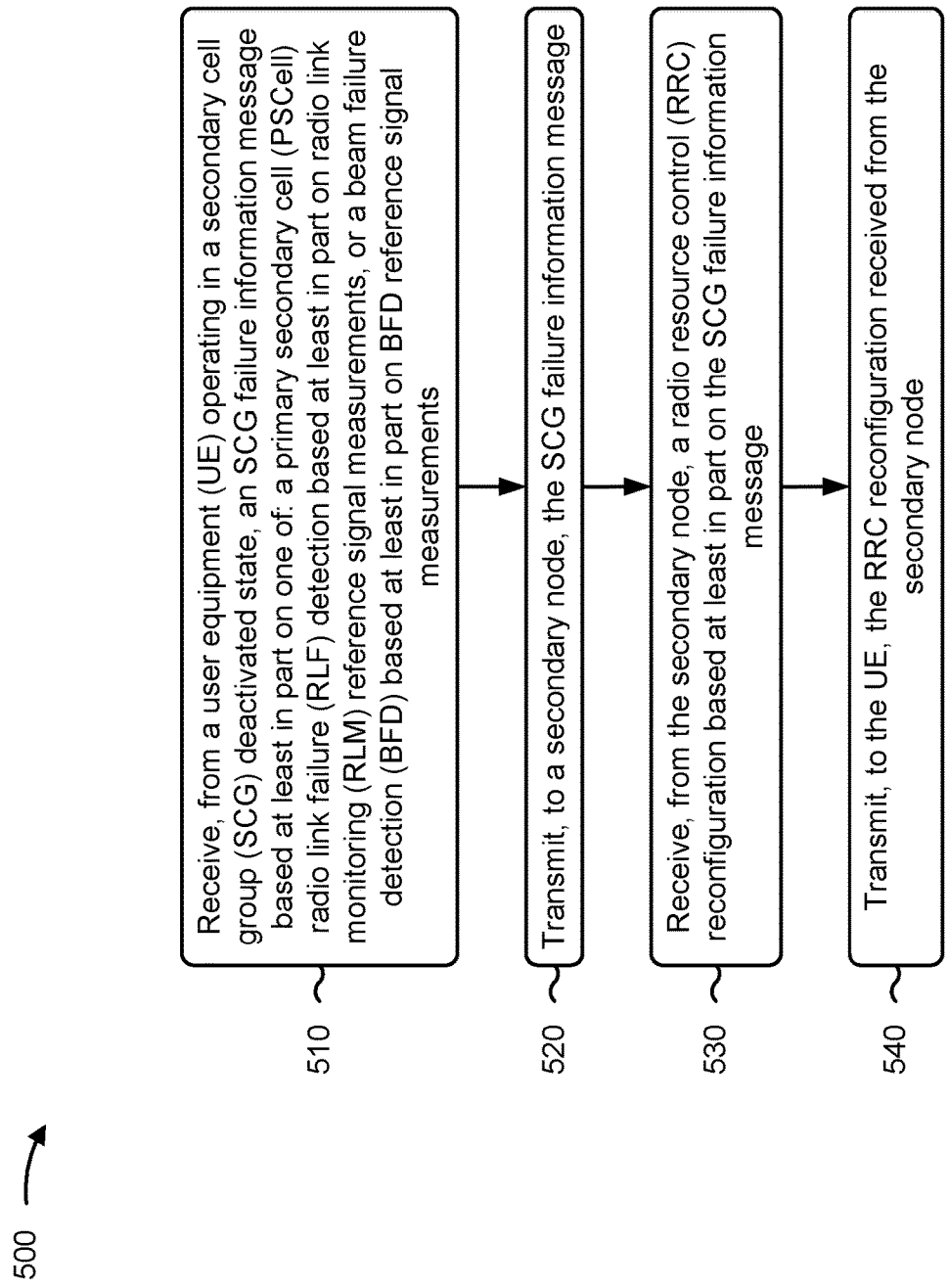

FIG. 5 is a diagram illustrating an example process 500 performed, for example, by a master node, in accordance with the present disclosure. Example process 500 is an example where the master node (e.g., base station 110) performs operations associated with UE communications while operating in an SCG deactivated state.

As shown in FIG. 5, in some aspects, process 500 may include receiving, from a UE operating in an SCG deactivated state, an SCG failure information message based at least in part on one of: a PSCell RLF detection based at least in part on RLM reference signal measurements, or a BFD based at least in part on BFD reference signal measurements (block 510). For example, the master node (e.g., using reception component 702, depicted in FIG. 7) may receive, from a UE operating in an SCG deactivated state, an SCG failure information message based at least in part on one of: a PSCell RLF detection based at least in part on RLM reference signal measurements, or a BFD based at least in part on BFD reference signal measurements, as described above.

As further shown in FIG. 5, in some aspects, process 500 may include transmitting, to a secondary node, the SCG failure information message (block 520). For example, the master node (e.g., using transmission component 704, depicted in FIG. 7) may transmit, to a secondary node, the SCG failure information message, as described above.

As further shown in FIG. 5, in some aspects, process 500 may include receiving, from the secondary node, an RRC reconfiguration based at least in part on the SCG failure information message (block 530). For example, the master node (e.g., using reception component 702, depicted in FIG. 7) may receive, from the secondary node, an RRC reconfiguration based at least in part on the SCG failure information message, as described above.

As further shown in FIG. 5, in some aspects, process 500 may include transmitting, to the UE, the RRC reconfiguration received from the secondary node (block 540). For example, the master node (e.g., using transmission component 704, depicted in FIG. 7) may transmit, to the UE, the RRC reconfiguration received from the secondary node, as described above.

Process 500 may include additional aspects, such as any single aspect or any combination of aspects described below and/or in connection with one or more other processes described elsewhere herein.

In a first aspect, process 500 includes receiving, from the secondary node, a configuration that enables the UE to initiate an SCG failure recovery procedure based at least in part on the BFD, and transmitting, to the UE, the configuration received from the secondary node.

In a second aspect, alone or in combination with the first aspect, the SCG failure information message indicates one or more of the RLM reference signal measurements, the BFD reference signal measurements, or other reference signal measurements to be reported by the UE based at least in part on the configuration received from the master node or from the secondary node via the master node.

In a third aspect, alone or in combination with one or more of the first and second aspects, the RRC reconfiguration indicates an updated set of beams for the UE to measure, and an updated RLM configuration that includes an updated set of RLM reference signals for the UE to measure.

In a fourth aspect, alone or in combination with one or more of the first through third aspects, the RRC reconfiguration includes an information element associated with performing RLM measurements, performing BFD measurements, and reporting of measurement results including beam measurements based at least in part on detection of the PSCell RLF or the BFD while the UE is operating in the SCG deactivated state.

In a fifth aspect, alone or in combination with one or more of the first through fourth aspects, the RRC reconfiguration indicates a set of RLM reference signals for the UE to measure, a set of reference signals for the UE to measure separate from the set of RLM reference signals and a set of BFD reference signals, and the set of BFD reference signals for the UE to measure, wherein the RLM reference signals, the reference signals separate from the RLM reference signals and the set of BFD reference signals, and the BFD reference signals are configured to be transmitted by the secondary node using beams associated with the PSCell.

In a sixth aspect, alone or in combination with one or more of the first through fifth aspects, the RRC reconfiguration indicates that the UE is to transmit the SCG failure information message based at least in part on the BFD, and that the SCG failure information message is to include a beam measurement report.

In a seventh aspect, alone or in combination with one or more of the first through sixth aspects, the RRC reconfiguration indicates that the SCG failure information message is to include a beam measurement report when the UE is operating in the SCG deactivated state.

In an eighth aspect, alone or in combination with one or more of the first through seventh aspects, the RRC reconfiguration indicates that the SCG failure information message is to include one or more of the RLM reference signal measurements, the BFD reference signal measurements, or reference signal measurements separate from the RLM reference signal measurements and the BFD reference signal measurements.

In a ninth aspect, alone or in combination with one or more of the first through eighth aspects, the RRC reconfiguration indicates a RACH parameter configuration for the UE to use after transitioning from the SCG deactivated state to an SCG activated state, wherein the RACH parameter configuration defines one or more of beams to use for performing RACH and associated RACH occasions or preamble indices.

In a tenth aspect, alone or in combination with one or more of the first through nineth aspects, process 500 includes transmitting, to the UE, an SCG activation command to transition the UE from the SCG deactivated state to an SCG activated state, wherein the SCG activation command indicates a RACH parameter configuration, wherein the RACH parameter configuration defines one or more beams to use for performing RACH and associated RACH occasions, or preamble indices.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
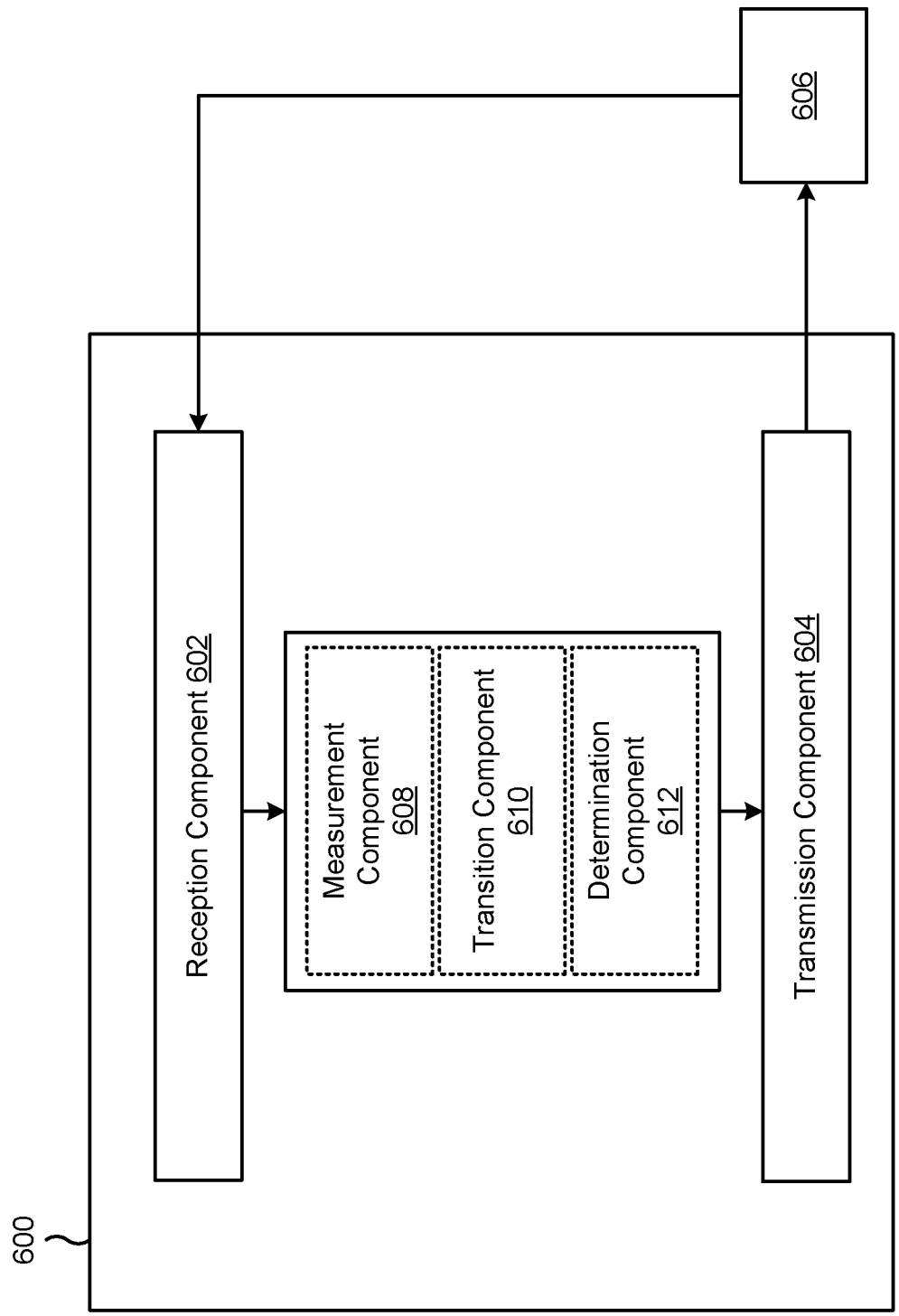
FIGS. 6-7 are block diagrams of example apparatuses for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include one or more of a measurement component 608, a transition component 610, or a determination component 612, among other examples.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The measurement component 608 may perform RLM reference signal measurements on a PSCell while the UE is operating in an SCG deactivated state. The measurement component 608 may perform BFD reference signal measurements while the UE is operating in the SCG deactivated state. The transmission component 604 may transmit, to a master node associated with an MCG, an SCG failure information message based at least in part on one of: a PSCell RLF detection based at least in part on the RLM reference signal measurements, or a BFD based at least in part on the BFD reference signal measurements.

The reception component 602 may receive, from the master node associated with the MCG or from a secondary node via the master node, a configuration that enables the UE to initiate the SCG failure recovery procedure based at least in part on the BFD.

The reception component 602 may receive, from the master node associated with the MCG or from a secondary node via the master node, an RRC reconfiguration based at least in part on the SCG failure information message transmitted to the master node and forwarded by the master node to the secondary node, wherein the RRC reconfiguration indicates: an updated set of beams for the UE to measure, and an updated RLM configuration that includes an updated set of RLM reference signals for the UE to measure.

The measurement component 608 may perform updated RLM reference signal measurements based at least in part on the RRC reconfiguration received from the master node or from the secondary node via the master node.

The reception component 602 may receive, from the master node, an SCG activation command to transition the UE from the SCG deactivated state to an SCG activated state, wherein the SCG activation command indicates a RACH parameter configuration, wherein the RACH parameter configuration defines one or more beams to use for performing RACH and associated RACH occasions or preamble indices.

The transition component 610 may transition from the SCG deactivated state to an SCG activated state. The determination component 612 may determine that a timing advance timer has expired. The determination component 612 may determine to perform a RACH procedure to access the PSCell based at least in part on the timing advance timer being expired, wherein the RACH procedure is based at least in part on a RACH parameter configuration.

The transition component 610 may transition from the SCG deactivated state to an SCG activated state. The determination component 612 may determine that a timing advance timer has not expired. The determination component 612 may determine to not perform a RACH procedure to access the PSCell based at least in part on the timing advance timer not being expired.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
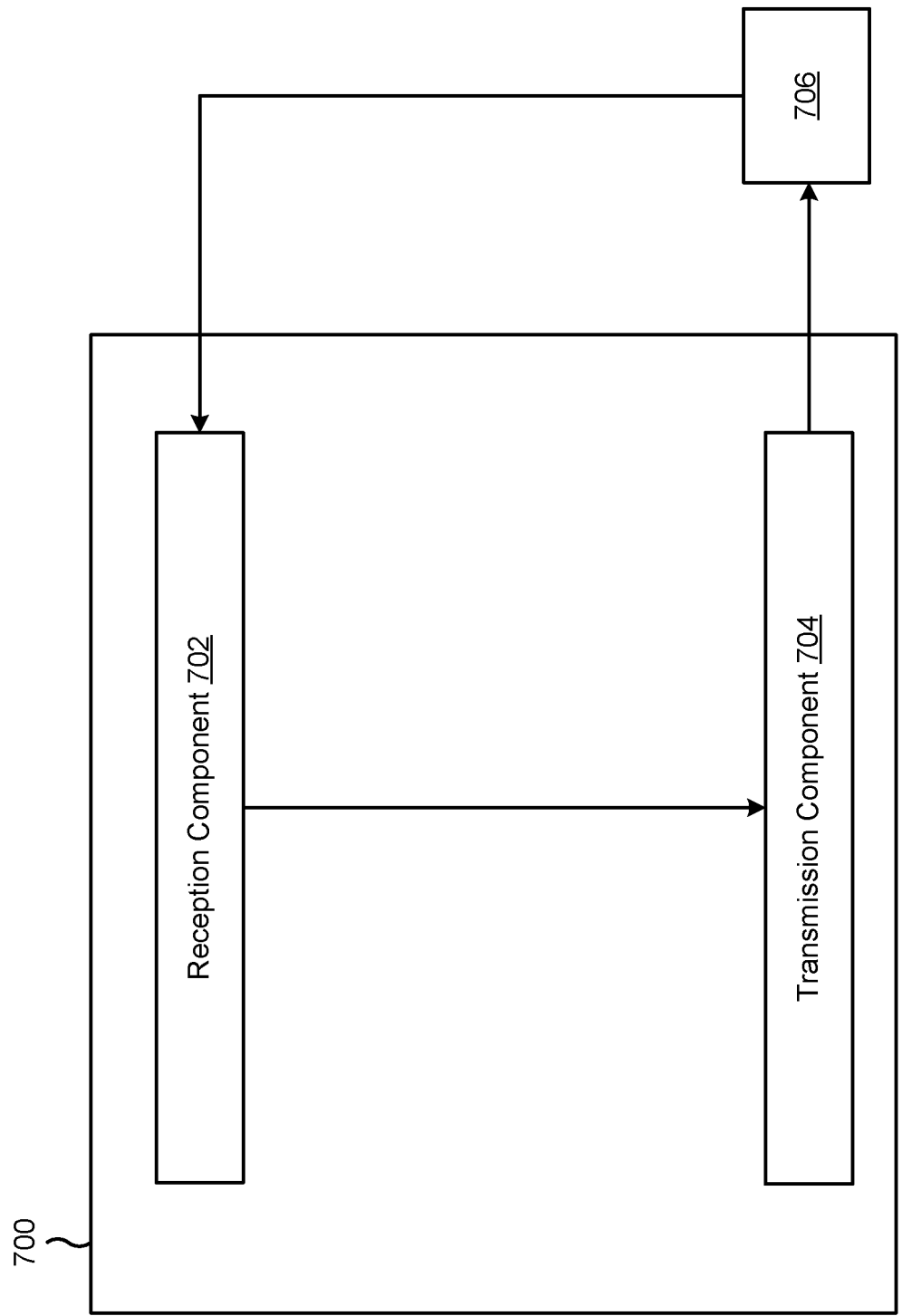

FIG. 7 is a block diagram of an example apparatus 700 for wireless communication. The apparatus 700 may be a master node, or a master node may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5. In some aspects, the apparatus 700 and/or one or more components shown in FIG. 7 may include one or more components of the master node described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the master node described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the master node described above in connection with FIG. 2. In some aspects, the transmission component 704 may be co-located with the reception component 702 in a transceiver.

The reception component 702 may receive, from a UE operating in an SCG deactivated state, an SCG failure information message based at least in part on one of: a PSCell RLF detection based at least in part on RLM reference signal measurements, or a BFD based at least in part on BFD reference signal measurements. The transmission component 704 may transmit, to a secondary node, the SCG failure information message. The reception component 702 may receive, from the secondary node, an RRC reconfiguration based at least in part on the SCG failure information message. The transmission component 704 may transmit, to the UE, the RRC reconfiguration received from the secondary node.

The reception component 702 may receive, from the secondary node, a configuration that enables the UE to initiate an SCG failure recovery procedure based at least in part on the BFD. The transmission component 704 may transmit, to the UE, the configuration received from the secondary node. The transmission component 704 may transmit, to the UE, an SCG activation command to transition the UE from the SCG deactivated state to an SCG activated state, wherein the SCG activation command indicates a RACH parameter configuration, wherein the RACH parameter configuration defines one or more beams to use for performing RACH and associated RACH occasions, or preamble indices.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some aspects of the present disclosure:

Aspect 1: A method of wireless communication performed by a user equipment (UE), comprising: performing radio link monitoring (RLM) reference signal measurements on a primary secondary cell (PSCell) while the UE is operating in a secondary cell group (SCG) deactivated state; performing beam failure detection (BFD) reference signal measurements while the UE is operating in the SCG deactivated state; and transmitting, to a master node associated with a master cell group (MCG), an SCG failure information message based at least in part on one of: a PSCell radio link failure (RLF) detection based at least in part on the RLM reference signal measurements, or a BFD based at least in part on the BFD reference signal measurements.

Aspect 2: The method of aspect 1, wherein the SCG failure information message is transmitted based at least in part on an SCG failure recovery procedure initiated at the UE.

Aspect 3: The method of any of aspects 1 through 2, further comprising: receiving, from the master node associated with the MCG or from a secondary node via the master node, a configuration that enables the UE to initiate the SCG failure recovery procedure based at least in part on the BFD.

Aspect 4: The method of any of aspects 1 through 3, wherein the SCG failure information message indicates one or more of: the RLM reference signal measurements, the BFD reference signal measurements, or other reference signal measurements to be reported by the UE based at least in part on the configuration received from the master node or from the secondary node via the master node.

Aspect 5: The method of any of aspects 1 through 4, further comprising: receiving, from the master node associated with the MCG or from a secondary node via the master node, a radio resource control (RRC) reconfiguration based at least in part on the SCG failure information message transmitted to the master node and forwarded by the master node to the secondary node, wherein the RRC reconfiguration indicates: an updated set of beams for the UE to measure, and an updated RLM configuration that includes an updated set of RLM reference signals for the UE to measure.

Aspect 6: The method of any of aspects 1 through 5, further comprising: performing updated RLM reference signal measurements based at least in part on the RRC reconfiguration received from the master node or from the secondary node via the master node.

Aspect 7: The method of any of aspects 1 through 6, wherein the RRC reconfiguration includes an information element associated with performing RLM measurements, performing BFD measurements, and reporting of measurement results including beam measurements based at least in part on detection of the PSCell RLF or the BFD while the UE is operating in the SCG deactivated state.

Aspect 8: The method of any of aspects 1 through 7, wherein the RRC reconfiguration indicates: a set of RLM reference signals for the UE to measure; a set of reference signals for the UE to measure separate from the set of RLM reference signals and a set of BFD reference signals; and the set of BFD reference signals for the UE to measure, wherein the RLM reference signals, the reference signals separate from the RLM reference signals and the set of BFD reference signals, and the BFD reference signals are configured to be transmitted by the secondary node using beams associated with the PSCell.

Aspect 9: The method of any of aspects 1 through 8, wherein the RRC reconfiguration indicates that the UE is to transmit the SCG failure information message based at least in part on the BFD, and that the SCG failure information message is to include a beam measurement report.

Aspect 10: The method of any of aspects 1 through 9, wherein the RRC reconfiguration indicates that the SCG failure information message is to include a beam measurement report when the UE is operating in the SCG deactivated state.

Aspect 11: The method of any of aspects 1 through 10, wherein the RRC reconfiguration indicates that the SCG failure information message is to include one or more of the RLM reference signal measurements, the BFD reference signal measurements, or reference signal measurements separate from the RLM reference signal measurements and the BFD reference signal measurements.

Aspect 12: The method of any of aspects 1 through 11, wherein the RRC reconfiguration indicates a random access channel (RACH) parameter configuration for the UE to use after transitioning from the SCG deactivated state to an SCG activated state, wherein the RACH parameter configuration defines one or more of beams to use for performing RACH and associated RACH occasions or preamble indices.

Aspect 13: The method of any of aspects 1 through 12, further comprising: receiving, from the master node, an SCG activation command to transition the UE from the SCG deactivated state to an SCG activated state, wherein the SCG activation command indicates a random access channel (RACH) parameter configuration, wherein the RACH parameter configuration defines one or more of beams to use for performing RACH and associated RACH occasions or preamble indices.

Aspect 14: The method of any of aspects 1 through 13, further comprising: transitioning from the SCG deactivated state to an SCG activated state; determining that a timing advance timer has expired; and determining to perform a random access channel (RACH) procedure to access the PSCell based at least in part on the timing advance timer being expired, wherein the RACH procedure is based at least in part on a RACH parameter configuration.

Aspect 15: The method of any of aspects 1 through 14, further comprising: transitioning from the SCG deactivated state to an SCG activated state; determining that a timing advance timer has not expired; and determining to not perform a random access channel (RACH) procedure to access the PSCell based at least in part on the timing advance timer not being expired.

Aspect 16: A method of wireless communication performed by a node, comprising: receiving, from a user equipment (UE) operating in a secondary cell group (SCG) deactivated state, an SCG failure information message based at least in part on one of: a primary secondary cell (PSCell) radio link failure (RLF) detection based at least in part on radio link monitoring (RLM) reference signal measurements, or a beam failure detection (BFD) based at least in part on BFD reference signal measurements; transmitting, to a secondary node, the SCG failure information message; receiving, from the secondary node, a radio resource control (RRC) reconfiguration based at least in part on the SCG failure information message; and transmitting, to the UE, the RRC reconfiguration received from the secondary node.

Aspect 17: The method of aspect 16, further comprising: receiving, from the secondary node, a configuration that enables the UE to initiate an SCG failure recovery procedure based at least in part on the BFD; and transmitting, to the UE, the configuration received from the secondary node.

Aspect 18: The method of any of aspects 16 through 17, wherein the SCG failure information message indicates one or more of: the RLM reference signal measurements, the BFD reference signal measurements, or other reference signal measurements to be reported by the UE based at least in part on the configuration received from the master node or from the secondary node via the master node.

Aspect 19: The method of any of aspects 16 through 18, wherein the RRC reconfiguration indicates: an updated set of beams for the UE to measure, and an updated RLM configuration that includes an updated set of RLM reference signals for the UE to measure.

Aspect 20: The method of any of aspects 16 through 19, wherein the RRC reconfiguration includes an information element associated with performing RLM measurements, performing BFD measurements, and reporting of measurement results including beam measurements based at least in part on detection of the PSCell RLF or the BFD while the UE is operating in the SCG deactivated state.

Aspect 21: The method of any of aspects 16 through 20, wherein the RRC reconfiguration indicates: a set of RLM reference signals for the UE to measure; a set of reference signals for the UE to measure separate from the set of RLM reference signals and a set of BFD reference signals; and the set of BFD reference signals for the UE to measure, wherein the RLM reference signals, the reference signals separate from the RLM reference signals and the set of BFD reference signals, and the BFD reference signals are configured to be transmitted by the secondary node using beams associated with the PSCell.

Aspect 22: The method of any of aspects 16 through 21, wherein the RRC reconfiguration indicates that the UE is to transmit the SCG failure information message based at least in part on the BFD, and that the SCG failure information message is to include a beam measurement report.

Aspect 23: The method of any of aspects 16 through 22, wherein the RRC reconfiguration indicates that the SCG failure information message is to include a beam measurement report when the UE is operating in the SCG deactivated state.

Aspect 24: The method of any of aspects 16 through 23, wherein the RRC reconfiguration indicates that the SCG failure information message is to include one or more of the RLM reference signal measurements, the BFD reference signal measurements, or reference signal measurements separate from the RLM reference signal measurements and the BFD reference signal measurements.

Aspect 25: The method of any of aspects 16 through 24, wherein the RRC reconfiguration indicates a random access channel (RACH) parameter configuration for the UE to use after transitioning from the SCG deactivated state to an SCG activated state, wherein the RACH parameter configuration defines one or more of beams to use for performing RACH and associated RACH occasions or preamble indices.

Aspect 26: The method of any of aspects 16 through 25, further comprising: transmitting, to the UE, an SCG activation command to transition the UE from the SCG deactivated state to an SCG activated state, wherein the SCG activation command indicates a random access channel (RACH) parameter configuration, wherein the RACH parameter configuration defines one or more beams to use for performing RACH and associated RACH occasions, or preamble indices.

Aspect 27: An apparatus for wireless communication at a device, comprising a processor; memory coupled with the processor; and instructions stored in the memory and executable by the processor to cause the apparatus to perform the method of one or more aspects of aspects 1-15.

Aspect 28: A device for wireless communication, comprising a memory and one or more processors coupled to the memory, the memory and the one or more processors configured to perform the method of one or more aspects of aspects 1-15.

Aspect 29: An apparatus for wireless communication, comprising at least one means for performing the method of one or more aspects of aspects 1-15.

Aspect 30: A non-transitory computer-readable medium storing code for wireless communication, the code comprising instructions executable by a processor to perform the method of one or more aspects of aspects 1-15.

Aspect 31: A non-transitory computer-readable medium storing a set of instructions for wireless communication, the set of instructions comprising one or more instructions that, when executed by one or more processors of a device, cause the device to perform the method of one or more aspects of aspects 1-15.

Aspect 32: An apparatus for wireless communication at a device, comprising a processor; memory coupled with the processor; and instructions stored in the memory and executable by the processor to cause the apparatus to perform the method of one or more aspects of aspects 16-26.

Aspect 33: A device for wireless communication, comprising a memory and one or more processors coupled to the memory, the memory and the one or more processors configured to perform the method of one or more aspects of aspects 16-26.

Aspect 34: An apparatus for wireless communication, comprising at least one means for performing the method of one or more aspects of aspects 16-26.

Aspect 35: A non-transitory computer-readable medium storing code for wireless communication, the code comprising instructions executable by a processor to perform the method of one or more aspects of aspects 16-26.

Aspect 36: A non-transitory computer-readable medium storing a set of instructions for wireless communication, the set of instructions comprising one or more instructions that, when executed by one or more processors of a device, cause the device to perform the method of one or more aspects of aspects 16-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
a memory comprising instructions; and
one or more processors configured to execute the instructions and cause the apparatus to:
perform radio link monitoring (RLM) reference signal measurements on a primary secondary cell (PSCell) while the apparatus is operating in a secondary cell group (SCG) deactivated state;
perform beam failure detection (BFD) reference signal measurements while the apparatus is operating in the SCG deactivated state; and
output for transmission, to a master node associated with a master cell group (MCG) while the apparatus is operating in the SCG deactivated state, an SCG failure information message if at least one of: a PSCell radio link failure (RLF) is detected based at least in part on the RLM reference signal measurements or a beam failure is detected based at least in part on the BFD reference signal measurements; and obtain, from the master node or from a secondary node via the master node, a radio resource control (RRC) reconfiguration based on the SCG failure information message, wherein the RRC reconfiguration indicates: an updated set of beams, and an updated RLM configuration that includes an updated set of RLM reference signals.

2. The apparatus of claim 1, wherein the SCG failure information message is outputted for transmission based on an SCG failure recovery procedure.

3. The apparatus of claim 1, wherein the one or more processors are further configured to cause the apparatus to:
obtain, from the master node associated with the MCG or from the secondary node via the master node, a configuration based on the SCG failure information message,
wherein the SCG failure information message indicates at least one of: the RLM reference signal measurements, the BFD reference signal measurements, or other reference signal measurements that are to be reported by the apparatus based on the configuration.

4. The apparatus of claim 1, wherein the one or more processors are further configured to cause the apparatus to: perform updated RLM reference signal measurements based on the RRC reconfiguration.

5. The apparatus of claim 1, wherein the RRC reconfiguration includes at least one of: a first information element associated with the performing of the RLM reference signal measurements, a second information element associated with the performing of the BFD measurements, or a third information element associated with reporting beam measurement results.

6. The apparatus of claim 1, wherein the updated set of beams includes:
a set of additional reference signals; and
a set of BFD reference signals,
wherein the set of RLM reference signals, the set of additional reference signals, and the updated set of BFD reference signals are obtained from the secondary node.

7. The apparatus of claim 1, wherein the RRC reconfiguration further indicates at least one of:
the apparatus is to transmit the output for transmission a next SCG failure information message based on a next beam failure, or
the next SCG failure information message is to include a beam measurement report.

8. The apparatus of claim 1, wherein the RRC reconfiguration further indicates that a next SCG failure information message is to include a beam measurement report and is to output for transmission by the apparatus if the apparatus is operating in the SCG deactivated state.

9. The apparatus of claim 1, wherein the RRC reconfiguration further indicates that a next SCG failure information message is to include at least one of: updated RLM reference signal measurements, updated BFD reference signal measurements, or additional updated reference signal measurements.

10. The apparatus of claim 1, wherein the RRC reconfiguration further indicates a random access channel (RACH) parameter configuration associated with the apparatus transitioning from the SCG deactivated state to an SCG activated state.

11. The apparatus of claim 1, wherein the one or more processors are further configured to cause the apparatus to:

obtain, from the master node, an SCG activation command to transition the apparatus from the SCG deactivated state to an SCG activated state,
wherein the SCG activation command indicates a random access channel (RACH) parameter configuration.

12. The apparatus of claim 1, wherein the one or more processors are further configured to cause the apparatus to:
transition from the SCG deactivated state to an SCG activated state based at least in part on outputting for transmission the SCG failure information message; and
perform a random access channel (RACH) procedure to access the PSCell based on transitioning from the SCG deactivated state to the SCG activated state and further based on a timing advance timer expiring.

13. The apparatus of claim 1, wherein the one or more processors are further configured to cause the apparatus to:
transition from the SCG deactivated state to an SCG activated state based on outputting for transmission the SCG failure information message; and
outputting for transmission a communication on via configured beam satisfying a measured signal quality, the outputting for transmission of the communication being based on transitioning from the SCG deactivated state to the SCG activated state and further based on a timing advance timer not being expired.

14. The apparatus of claim 1, wherein the SCG failure information message is outputted for transmission if the beam failure is detected based at least in part on the BFD reference signal measurements.

15. The apparatus of claim 1, further comprising at least one transceiver to transmit the SCG failure information message and receive the RRC reconfiguration,
wherein the apparatus is configured as a user equipment.

16. An apparatus for wireless communication, comprising:
a memory comprising instructions; and
one or more processors configured to execute the instructions and cause the apparatus to:
obtain, from a user equipment (UE) operating in a secondary cell group (SCG) deactivated state, an SCG failure information message if at least one of: a primary secondary cell (PSCell) radio link failure (RLF) is detected based at least in part on radio link monitoring (RLM) reference signal measurements, or a beam failure is detected based at least in part on beam failure detection (BFD) reference signal measurements;
output for transmission, to a secondary node, the SCG failure information message;
obtain, from the secondary node, a radio resource control (RRC) reconfiguration based at least in part on the SCG failure information message, wherein the RRC reconfiguration indicates: an updated set of beams, and an updated RLM configuration that includes an updated set of RLM reference; and
output for transmission, to the UE, the RRC reconfiguration.

17. The apparatus of claim 16, wherein the one or more processors are further configured to cause the apparatus to:
obtain, from the secondary node, a configuration indicating at least one of: the RLM reference signal measurements, the BFD reference signal measurements, or other reference signal measurements that are to be reported by the UE based on the configuration; and
output for transmission, to the UE, the configuration.

18. The apparatus of claim 16, wherein the RRC reconfiguration includes at least one of: a first information element associated with performing of the RLM reference signal measurements, a second information element associated with performing of the BFD measurements, or a third information element associated with reporting beam measurement results.

19. The apparatus of claim 16, wherein the updated set of beams includes:
a set of additional reference signals; and
a set of BFD reference signals,
wherein the set of RLM reference signals, the set of additional reference signals, and the updated set of BFD reference signals are obtained from the secondary node.

20. The apparatus of claim 16, wherein the RRC reconfiguration further indicates at least one of:
the UE is to output for transmission a next SCG failure information message based on a next beam failure,
the next SCG failure information message is to include a beam measurement report;
the next SCG failure information message is to include one or more of: updated RLM reference signal measurements, updated BFD reference signal measurements, or additional updated reference signal measurements; or
a random access channel (RACH) parameter configuration associated with the UE transitioning from the SCG deactivated state to an SCG activated state.

21. The apparatus of claim 16, wherein the one or more processors are further configured to cause the apparatus to:
output for transmission, to the UE, an SCG activation command, to transition the UE from the SCG deactivated state to an SCG activated state, based on outputting for transmission the RRC reconfiguration,
wherein the SCG activation command indicates a random access channel (RACH) parameter configuration.

22. The apparatus of claim 16, further comprising at least one transceiver configured to:
receive, from the UE, the SCG failure information message,
transmit, to the secondary node, the SCG failure information message,
receive, from the secondary node, the RRC reconfiguration, and
transmit, to the UE, the RRC reconfiguration,
wherein the apparatus is configured as a master node.

23. A method of wireless communication performed at a user equipment (UE), comprising:
performing radio link monitoring (RLM) reference signal measurements on a primary secondary cell (PSCell) while the UE is operating in a secondary cell group (SCG) deactivated state;
performing beam failure detection (BFD) reference signal measurements while the UE is operating in the SCG deactivated state;
outputting for transmission, to a master node associated with a master cell group (MCG) while the UE is operating in the SCG deactivated state, an SCG failure information message if at least one of: a PSCell radio link failure (RLF) is detected based at least in part on the RLM reference signal measurements or a beam failure is detected based at least in part on the BFD reference signal measurements; and obtaining, from the master node or from a secondary node via the master node, a radio resource control (RRC) reconfiguration based on the SCG failure information message,
wherein the RRC reconfiguration indicates: an updated set of beams, and an updated RLM configuration that includes an updated set of RLM reference signals.

24. The method of claim 23, further comprising:
obtaining, from the master node associated with the MCG or from the secondary node via the master node, a configuration associated with outputting for transmission the SCG failure information message,
wherein the SCG failure information message indicates at least one of: the RLM reference signal measurements, the BFD reference signal measurements, or additional reference signal measurements that are to be reported by the UE based on the configuration.

25. The method of claim 23, wherein the RRC reconfiguration further indicates at least one of:
the UE is to output for transmission a next SCG failure information message based on a next beam failure,
the next SCG failure information message is to include a beam measurement report;
the next SCG failure information message is to include one or more of updated RLM reference signal measurements, updated BFD reference signal measurements, or additional updated reference signal measurements; or
a random access channel (RACH) parameter configuration associated with the UE transitioning from the SCG deactivated state to an SCG activated state.

26. The method of claim 23, further comprising:
obtaining, from the master node, an SCG activation command, to transition the UE from the SCG deactivated state to an SCG activated state, based on outputting for transmission the SCG failure information message,
wherein the SCG activation command indicates a random access channel (RACH) parameter configuration.

27. A method of wireless communication performed at a master node, comprising:
obtaining, from a user equipment (UE) operating in a secondary cell group (SCG) deactivated state, an SCG failure information message if at least one of: a primary secondary cell (PSCell) radio link failure (RLF) is detected based at least in part on radio link monitoring (RLM) reference signal measurements, or a beam failure is detected based at least in part on beam failure detection (BFD) reference signal measurements;
outputting for transmission, to a secondary node, the SCG failure information message;
obtaining, from the secondary node, a radio resource control (RRC) reconfiguration based at least in part on the SCG failure information message, wherein the RRC reconfiguration indicates: an updated set of beams, and an updated RLM configuration that includes an updated set of RLM reference signals; and
outputting for transmission, to the UE, the RRC reconfiguration.

28. The method of claim 27, wherein the RRC reconfiguration further indicates at least one of:
a first information element associated with the performing of the RLM measurements,
a second information element associated with the performing of the BFD measurements, or a third information element associated with reporting of beam measurement results.

29. The method of claim 27, wherein the updated set of beams includes:
a set of additional reference signals; and
a set of BFD reference signals,
wherein the set of RLM reference signals, the set of additional reference signals, and the set of BFD reference signals are to be obtained from the secondary node.

30. The method of claim 27, further comprising:
outputting for transmission, to the UE, an SCG activation command, to transition the UE from the SCG deactivated state to an SCG activated state, based on outputting for transmission the RRC reconfiguration,
wherein the SCG activation command indicates a random access channel (RACH) parameter configuration.

* * * * *